(12) United States Patent
Stoye

(10) Patent No.: US 9,892,707 B2
(45) Date of Patent: Feb. 13, 2018

(54) DECOMPRESSING STORED DISPLAY DATA EVERY FRAME REFRESH

(71) Applicant: DisplayLink (UK) Limited, Cambridge (GB)

(72) Inventor: William Stoye, Cambridge (GB)

(73) Assignee: DisplayLink (UK) Limited, Cambridge (GB)

( * ) Notice: Subject to any disclaimer, the term of this patent is extended or adjusted under 35 U.S.C. 154(b) by 223 days.

(21) Appl. No.: 13/803,248

(22) Filed: Mar. 14, 2013

(65) Prior Publication Data

US 2014/0267335 A1    Sep. 18, 2014

(51) Int. Cl.
```
G09G 5/00      (2006.01)
G06T 9/00      (2006.01)
G06F 3/14      (2006.01)
H04N 19/426    (2014.01)
H04N 19/63     (2014.01)
```
(52) U.S. Cl.
CPC ............ *G09G 5/00* (2013.01); *G06F 3/1423* (2013.01); *G06F 3/1438* (2013.01); *G06T 9/00* (2013.01); *G09G 5/006* (2013.01); *H04N 19/428* (2014.11); *G09G 2340/02* (2013.01); *G09G 2360/18* (2013.01); *G09G 2370/12* (2013.01); *H04N 19/63* (2014.11)

(58) Field of Classification Search
CPC .. H04N 5/4401; H04N 19/428; G06F 3/1423; G09G 5/006; G09G 2340/02; G09G 2360/18
USPC ......................................................... 345/545
See application file for complete search history.

(56) References Cited

U.S. PATENT DOCUMENTS

| | | | |
|---|---|---|---|
| 5,835,082 A * | 11/1998 | Perego | ...................... G06T 9/00 345/542 |
| 6,020,924 A * | 2/2000 | Jahanghir | ................ 375/240.16 |
| 6,088,395 A | 7/2000 | Wang et al. | |
| 7,788,412 B2 * | 8/2010 | Guo et al. | ......................... 710/1 |
| 8,254,672 B2 * | 8/2012 | Matsuoka | .............. H04N 1/642 382/166 |

(Continued)

FOREIGN PATENT DOCUMENTS

| | | |
|---|---|---|
| EP | 0782345 | 7/1997 |
| EP | 0847203 | 6/1998 |

(Continued)

OTHER PUBLICATIONS

Wikipedia: Data Compression, as appearing on Mar. 9, 2013, at https://en.wikipedia.org/w/index.php?title=Data_compression&oldid=543003087.*

(Continued)

*Primary Examiner* — Kumar Patel
*Assistant Examiner* — Richard M Russell
(74) *Attorney, Agent, or Firm* — Edell, Shapiro & Finnan, LLC

(57) ABSTRACT

A display control device is connected to and controls a display device. The display control device comprises a frame buffer store, and a control component. The display control device is arranged to receive (S1) compressed display data, store (S2) the received compressed display data in the frame buffer store, and for each frame refresh of the display device access (S3) stored compressed display data, decompress (S4) the accessed display data, and output S5 the decompressed display data.

36 Claims, 6 Drawing Sheets

(56) References Cited

U.S. PATENT DOCUMENTS

| | | | | |
|---|---|---|---|---|
| 8,766,993 B1* | 7/2014 | Hobbs | | G06F 3/14 |
| | | | | 345/536 |
| 9,277,218 B2* | 3/2016 | Guo | | H04N 19/12 |
| 2006/0117371 A1* | 6/2006 | Margulis | | 725/131 |
| 2006/0130103 A1 | 6/2006 | Muroya et al. | | |
| 2008/0298463 A1 | 12/2008 | Stivers et al. | | |
| 2009/0132782 A1* | 5/2009 | Jeffrey | | G06F 3/14 |
| | | | | 711/173 |
| 2009/0300243 A1* | 12/2009 | Chao | | G06F 13/42 |
| | | | | 710/71 |
| 2012/0237182 A1* | 9/2012 | Eyer | | H04N 5/783 |
| | | | | 386/241 |
| 2013/0083843 A1* | 4/2013 | Bennett | | 375/240.02 |
| 2013/0235055 A1* | 9/2013 | Kim | | G09G 5/006 |
| | | | | 345/545 |
| 2013/0235941 A1* | 9/2013 | Koo | | G09G 5/006 |
| | | | | 375/240.26 |
| 2014/0328546 A1* | 11/2014 | Kourousias | | G06T 3/40 |
| | | | | 382/239 |
| 2015/0363976 A1* | 12/2015 | Henson | | H04N 13/0278 |
| | | | | 345/419 |
| 2016/0196804 A1* | 7/2016 | Skinner | | H04N 19/124 |
| | | | | 345/543 |

FOREIGN PATENT DOCUMENTS

| | | | | |
|---|---|---|---|---|
| WO | 9826606 | | 6/1998 | |
| WO | WO 2001011903 A1 * | 2/2001 | | H04Q 7/00 |
| WO | WO 2005083558 A1 * | 9/2005 | | G06F 3/1438 |

OTHER PUBLICATIONS

Office Action in United Kingdom Application No. GB1019766.3, dated Dec. 5, 2013, 3 pages.

* cited by examiner

DECOMPRESSING STORED DISPLAY DATA EVERY FRAME REFRESH

BACKGROUND OF THE INVENTION

This invention relates to a display control device and to a method of operating the display control device.

In desktop computing, it is now common to use more than one display device. Traditionally, a user would have a computer with a single display device attached, but now it is possible to have more than one display device attached to the computer, which increases the usable area for the worker. For example, International Patent Application Publication WO 2007/020408 discloses a display system which comprises a plurality of display devices, each displaying respectively an image, a data processing device connected to each display device and controlling the image displayed by each display device, and a user interface device connected to the data processing device. Connecting multiple display devices to a computer is a proven method for improving productivity.

The connection of an additional display device to a computer presents a number of problems. In general, a computer will be provided with only one video output such as a VGA-out connection. One method by which a second display device can be added to a computer is by adding an additional graphics card to the internal components of the computer. The additional graphics card will provide an additional video output which will allow the second display device to be connected to the computer and driven by that computer. However, this solution is relatively expensive and is not suitable for many nontechnical users of computers.

An alternative method of connecting the second display device is to connect the additional display device to a USB socket on the computer, as all modern computers are provided with multiple USB sockets. This provides a simple connection topology, but requires additional hardware and software to be present, as in general, USB has a bandwidth that makes the provision of a good quality video output a non-trivial task. It is also desirable that any additional hardware between the computer and the display device is kept as simple as possible. This means that when connecting an additional display device using a limited bandwidth technology such as USB, certain complex tasks can be difficult to achieve. In particular, a display control device needs to present that can receive the USB input and provide a suitable output to the display device.

As display technologies improve and the user's desire for display quality increases, the requirement placed upon the display control device that is receiving the incoming display data will correspondingly increase, as the amount of display data will increase proportionally. Since the whole point of the display control device is to provide a cost effective method of adding another display device, it is important that the costs of this device is kept to a minimum. It is obviously desirable that any new display control devices can handle higher definition video inputs and higher resolution display devices, so the ability to produce a high performance display control device at as low a cost as possible is highly desirable.

SUMMARY OF THE INVENTION

It is therefore an object of the invention to improve upon the known art.

According to a first aspect of the present invention, there is provided a method of operating a display control device connected to and controlling a display device, the method comprising the steps of receiving compressed display data, storing the received compressed display data, and for each frame refresh of the display device accessing stored compressed display data, decompressing the accessed display data, and outputting the decompressed display data.

According to a second aspect of the present invention, there is provided a display control device connected to and controlling a display device, the display control device comprising a frame buffer store, and one or more components arranged to receive compressed display data, store the received compressed display data in the frame buffer store, and for each frame refresh of the display device access stored compressed display data, decompress the accessed display data, and output the decompressed display data.

Owing to the invention, it is possible to provide a display control device that will have a reduced memory requirement and therefore a reduced cost with respect to a display control device of the same capability using an uncompressed memory buffer. Although it might seem counter-intuitive to decompress the stored display data every frame refresh, rather than store the display data in an uncompressed form as is conventional, the increase in complexity in the decompression unit of the display control device is far outweighed by the savings in memory. In particular, in many high-definition display systems, the need for an off-chip memory is removed, and this realises significant power and operational savings. All of the compressed display data can be stored on chip, without the need for a separate RAM for the display buffer.

Preferably, the step of storing the received compressed display data comprises storing the compressed display data without first decompressing the display data. In the preferred embodiment of the invention, the received display data once unpackaged from the transport protocol (such as USB) will be written into the frame buffer store exactly as is, without the need for any decompression or other processing of the received display data. This provides a simplified solution to the connection topology and to the process of receiving the display data and writing it into memory.

Advantageously, the step of storing the received compressed display data comprises storing compressed display data for two consecutive frames. To improve the working of the display control device with respect to its operation in a high-definition environment, it is advantageous to delay the display by a single frame and store two entire frames (in their compressed format) in the frame buffer. It is desirable to have enough storage for two or even three complete frames so as to avoid the visible artefact known as tearing. The update of the physical display panel at a refresh rate (say, 60 Hz) is not synchronised with the sending of new data to the display. If there is only exactly enough memory for the display, and the device is only half-way through updating the memory, then the refresh hardware may have no choice but to display half of the old picture and half of the new. If this happens repeatedly in a video then it is highly noticeable (and annoying) to the human viewer.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the present invention will now be described, by way of example only, with reference to the accompanying drawings, in which:—

DETAILED DESCRIPTION

Figure 1:
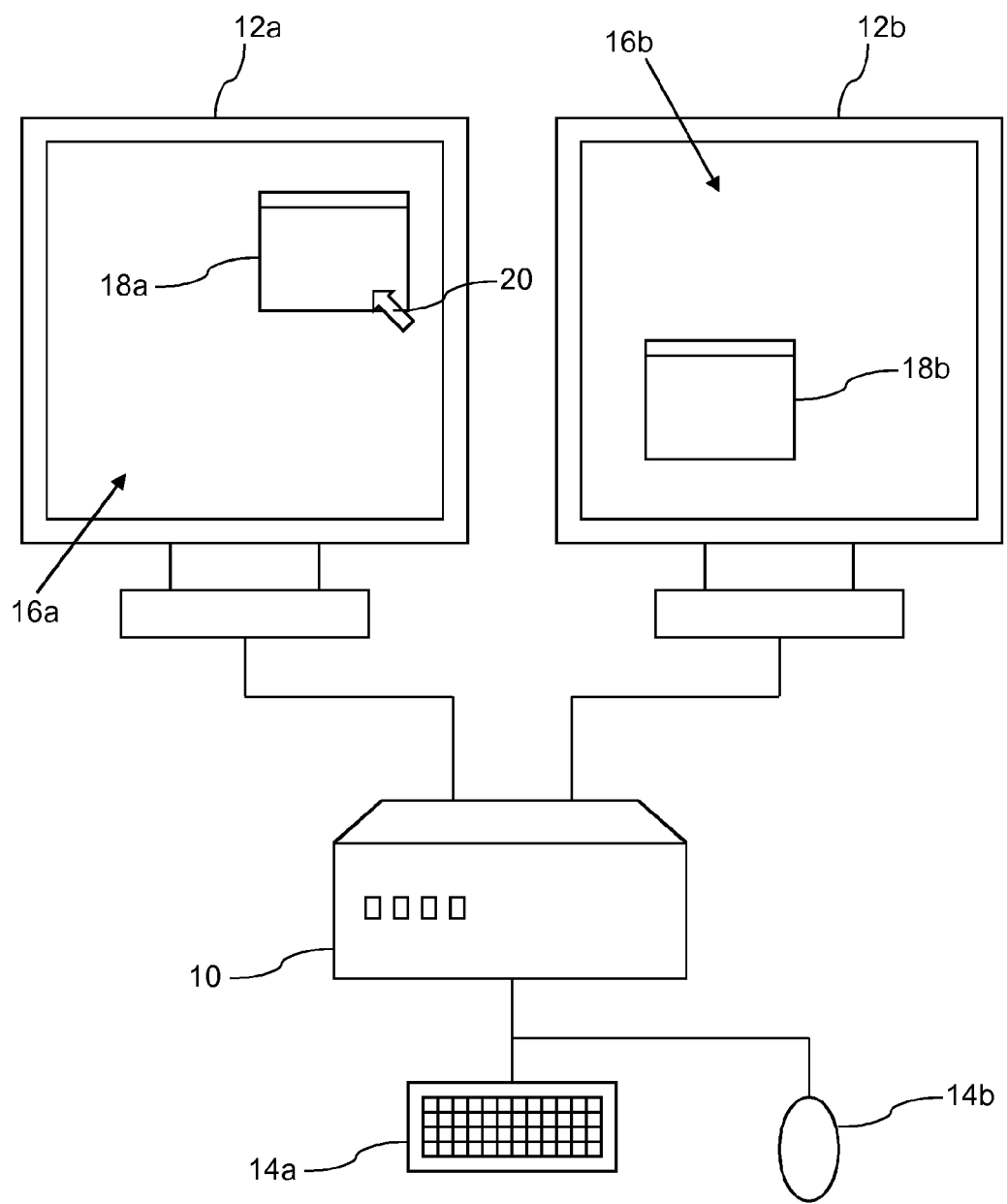
FIG. 1 is a schematic diagram of a display system.

A display system is shown in FIG. 1. The system comprises a processing device 10, display devices 12 and user interface devices 14. The user interface devices are a keyboard 14a and a mouse 14b. The system shown in FIG. 1 is a standard desktop computer, with an additional display device 12b, which is composed of discrete components that are locally located but could equally be a device such as a laptop computer or suitably enabled handheld device such as a mobile phone or pda (personal digital assistant) all using an additional display 12b. Similarly, the system may comprise part of a networked or mainframe computing system, in which case the processing device 10 may be located remotely from the user input devices 14 and the display devices 12, or indeed may have its function distributed amongst separate devices.

The display devices 12 show images 16, and the display of the images 16 is controlled by the processing device 10. One or more applications are running on the processing device 10 and these are represented to the user by corresponding application windows 18, with which the user can interact in a conventional manner. A cursor 20 is shown, and the user can control the movement of the cursor 20 about the images 16 shown on the display device 12 using the computer mouse 14b, again in a totally conventional manner. The user can perform actions with respect to any running application via the user interface device 14 and these actions result in corresponding changes in the images 16, displayed by the display device 12.

The operating system run by the processing device 10 uses virtual desktops to manage the multiple display devices 12. Each physical display device 12 is represented by a frame buffer that contains everything currently shown on that display device 12. The operating system is configured to arrange these frame buffers into a single virtual desktop. When these frame buffers are arranged in the virtual desktop 22 in the same relative positions in which the physical display devices 12 are relatively placed, then the operating system can draw objects on all the display devices 12 in a natural way. The virtual desktop is a combination of the respective images 16a and 16b being shown by the display devices 12. If the user moves the mouse 14a such that the cursor 20 moves right off the edge of one display device 12a, then the cursor 20 appears on the left of the display device 12b to the right. Similarly a window 18 spread across several display devices 12 appears properly lined up between the display devices 12.

Figure 2:
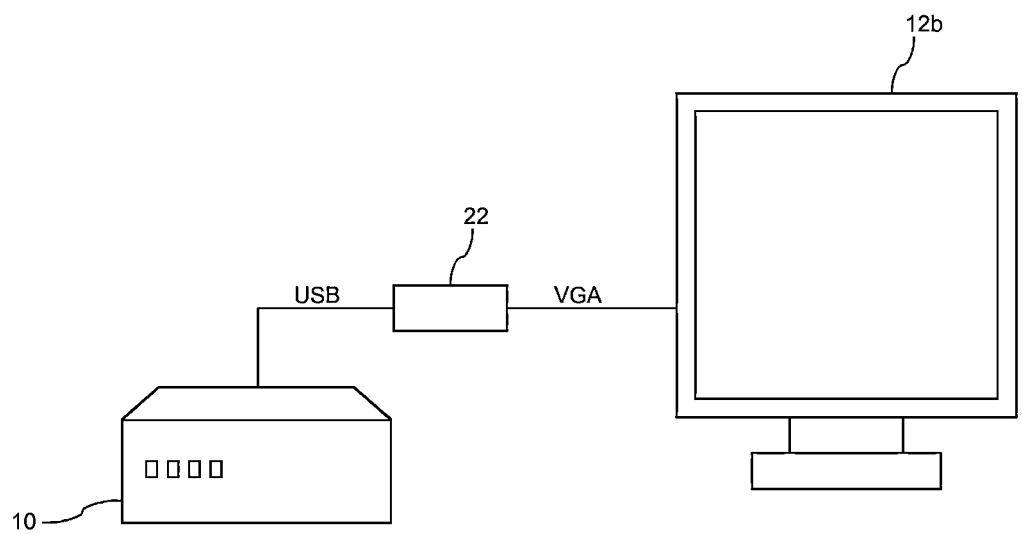
FIG. 2 is a schematic diagram of components of the display system.

More detail of the connection of the secondary display device 12b to the processing device 10 is shown in FIG. 2. The processing device 10 connects to the secondary display device 12b via a display control device 22. The display control device 22 is connected to the processing device 10 via a standard USB connection, and appears to the processing device 10 as a USB connected device. Any communications between the processing device 10 and the display control device 22 are carried out under the control of a USB driver specifically for the display control device 22. Such devices allow the connection of the secondary display device 12b to the processing device 10 without the need for any hardware changes to the processing device 10.

The display control device 22 connects to the display device 12b via a standard VGA connection, and the display device 12b is a conventional display device 12 which requires no adjustment to operate in the display system shown in FIG. 2. As far as the display device 12b is concerned, it could be connected directly to the graphics card of a processing device; it is unaware that the graphical data displayed by the display device 12b has actually been first sent via a USB connection to an intermediate component, the display control device 22. Multiple additional display devices 12 can be connected to the processing device 10 in this way, as long as suitable USB slots are available on the processing device 10.

The display control device 22 is external to the processing device 10 and is not a graphics card. It is a dedicated piece of hardware that receives graphical data via the USB connection from the processing device 10 and transforms that graphics data into a VGA format that will be understood by the display device 12b. In topological terms USB and VGA are only examples of data standards that can be used to connect the additional display device 12b to the processing device 10. The general principle is that a general-purpose data network (such as USB or Ethernet) connects the processing device 10 to the display control device 22 and a display-specific data standard (such as VGA or DVI) is used on the connection from the display control device 22 to the display device 12b.

Figure 3:
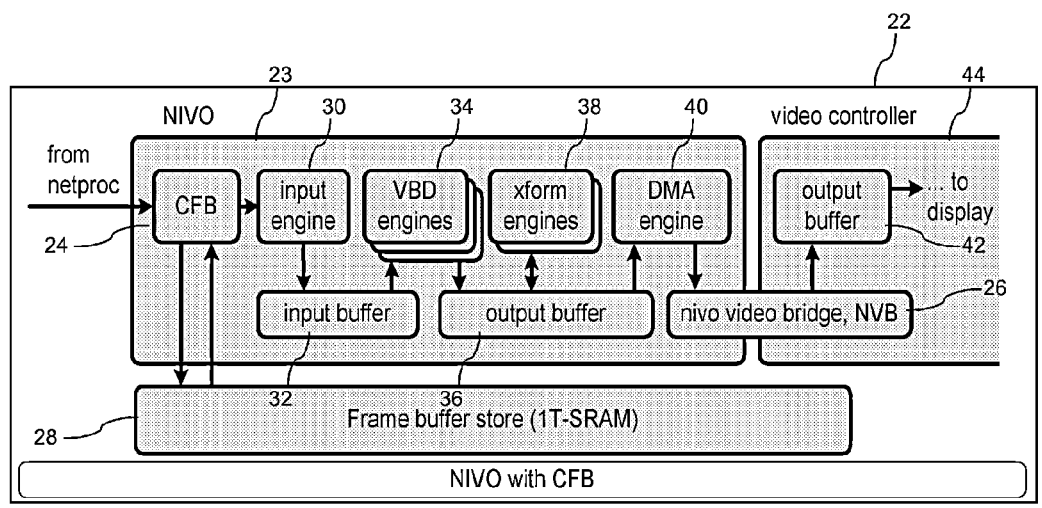
FIG. 3 is a schematic diagram of a display control device of the display system.

More detail of the display control device 22 is shown in FIG. 3. This Figure shows the flow of display data in the presence of a compressed frame buffer 24. In broad terms within the display control device 22 there are three separate devices; a N Iva 23, a video controller 44 and a frame buffer store 28. NIVO stands for network in, video out and is essentially a video decoder that receives compressed video over the USB connection and turns the compressed video into pixel data that can be used to refresh the display device 12. The video controller 44 is performing the physical refresh of the display device 12.

There are two important components, the CFB 24 itself and a NVB 26 (a Nivo Video Bridge). The display data from the data processing device 10 is stored in a frame buffer store 28 in compressed form, rather than being forwarded directly to the decompression components, as it arrives. No decompression is performed on the display data before it is stored. For each frame refresh of the display device 12, the display data is fetched by the CFB 24 and forwarded through the decompression components.

The decompression part of the display control device 22 comprises a series of components, being an input engine 30, an input buffer 32, VBD engines 34, an output buffer 36, xform engines 38 and a DMA engine 40, which connects to the NVB 26. The VBD engines 34 are entropy decoders, the xform engines 38 are performing tile transforms and the DMA engine 40 performs colour transforms. The original display data was compressed by being transformed, quantized and then entropy coded and these components of the NIVO 23 are effectively performing the reverse of these functions to decompress the display data back into pixel data.

The NVB 26 converts pixel tiles into pixel scan lines as required by video refresh, handles any timing differences between previous decode and video refresh requirements, and then passes the resulting pixels to an output buffer 42 of the video controller 44, as they are required. This stage may include some image improvement such as scaling or block edge filtering. The operation of the display control device 22 may give the impression that much more work is being done because the decode is performed for every refresh, but compared to a device that uses a large off-chip DRAM to store the uncompressed display data, a great deal of off-chip DRAM traffic is avoided and so the impact on power consumption is to reduce it rather than increase.

Figure 4:
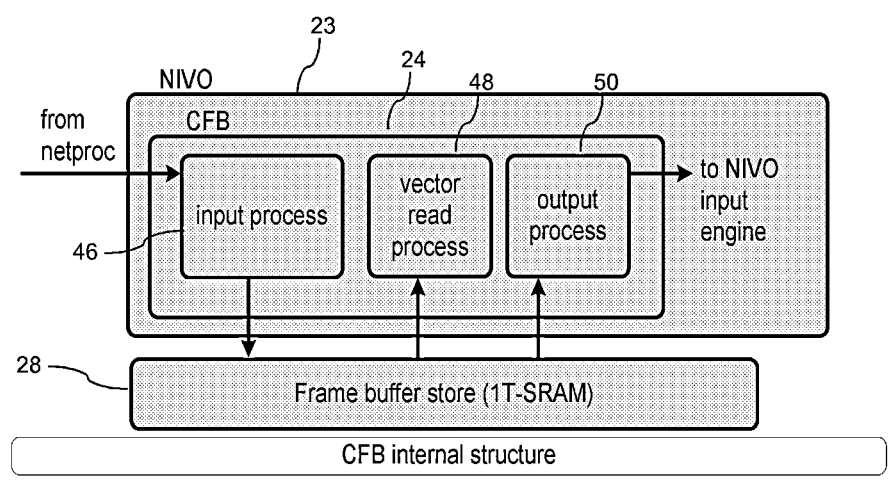
FIG. 4 is a schematic diagram of a compressed frame buffer of the display control device.

FIG. 4 shows the internal components of the control component, the CFB 24 in more detail. As data arrives from the data processing device 10 it is received at an input process 46 and stored in the frame buffer store 28. This part of the display control device 22 can be embodied as an ASIC using on-chip 1T-SRAM for the frame buffer store 28.

The format of the display data sent by the data processing device 10 is controlled by a host device driver that is responsible for store management in the compressed frame store 28. Each atom of display data (such as a tile group) sent from the host is prefixed with an address in the CFB store 28 at which the atom is to be saved. The host then sends a vector of pointers to the atoms, and a command to send those atoms for display. The vector of pointers is retained in the frame buffer store 28 along with the display data, so that if necessary the vector can be replayed for each refresh frame. For output one state machine reads the vector of pointers, and another state machine follows each pointer in turn to find an atom to be forwarded for display.

Figure 5:
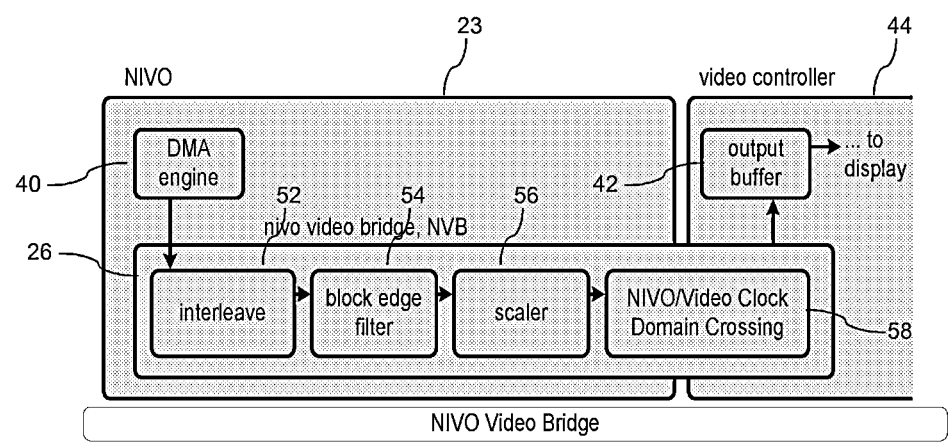
FIG. 5 is a schematic diagram of a decompression-video bridge of the display control device.

FIG. 5 shows the internal components of the Nivo Video Bridge 26 in more detail. The exact processing to be performed may vary depending on the final device specification. The output of the DMA engine 40 provides pixels in tile group order, while the video controller 44 requires them in image scan order. The interleave block 52 converts between these. The interleave block 52 requires storage equal to <height of tile group>×<width of widest display mode> in pixels. For full high-definition, with 16×1 tile groups this comes to 48 KB. No double buffering is required. The block edge filter 54 (if present) requires enough SRAM for a single scan-line of data (6 KB for full high-definition). This is discussed in more detail below. The scaler 56 (if present) requires enough SRAM for four scan-lines of data (24 KB for full high-definition). Again, this is discussed in more detail below.

The decompression/video clock domain crossing requires a small FIFO. The FIFO size may have to be increased for the worst-case lumpiness of NIVO output (in particular, to handle any gaps in NIVO output, for instance caused by PROC16 scheduling operations). The storage required is not significant. It may be advantageous to move the scaler 56 and/or the BEF 54 into the video clock domain 58. This would typically allow them to clock slower (using less power) while still meeting the requirements of the device.

However, the ordering of interleave block 52, BEF 54 and scaler 56 must be maintained.

The block edge filter 54 is not an essential part of the design but can be used in order to get better picture quality at a chosen compression level. At around 4 bpp the worst artefact that the compressed display data introduces is that in smoothly shaded areas of the image a faint grid of 4×4 pixels is visible. The provision of a very simple 2-pixel BEF 54 applied on a 4×4 grid removes this effect. Likewise, the upscaler 56 is not an essential part of the design but would give more freedom when attaching computers or portable devices to displays.

By using a display control device 22 with a frame buffer store 28 that stores compressed display data rather than uncompressed display data it is possible to reduce system cost as there are no DDR chips, no DDR pins, a simpler/cheaper PCB, a reduced physical size, reduced system power consumption, all of which is ideal for low-end systems. When using four bit/pixel double-buffered, or eight bit/pixel for a static display, it is enough to provide extremely good image quality with a device size using 2 Mbit of 1TSRAM, which is about 0.71 mm2 on 65 nm. This is a hard macrocell including control logic. 2 MBbyte would be 5.68 mm2. This is enough to provide full high-definition 4 bit/pixel for a double-buffered display or up to 8 bit/pixel for a static display.

There will be required some additional store for control data/code, 128 KB is enough for either USB or Ethernet-based input. 1 T-SRAM is faster than DDR and the bandwidth required by NIVO/video is greatly reduced, so a smaller ARC cache is probably sufficient. The decompression part of the device becomes a little bigger in order to support this mode of operation. In order to turn tile groups into video scan-lines an SRAM containing <tile group height>×<max width of display in pixels>×<store for a pixel> is required. For full high-definition using 16×1 tile groups this comes to 48 KB. The block edge filter requires another 6 KB. The scaler requires another 24 KB.

Figure 6:
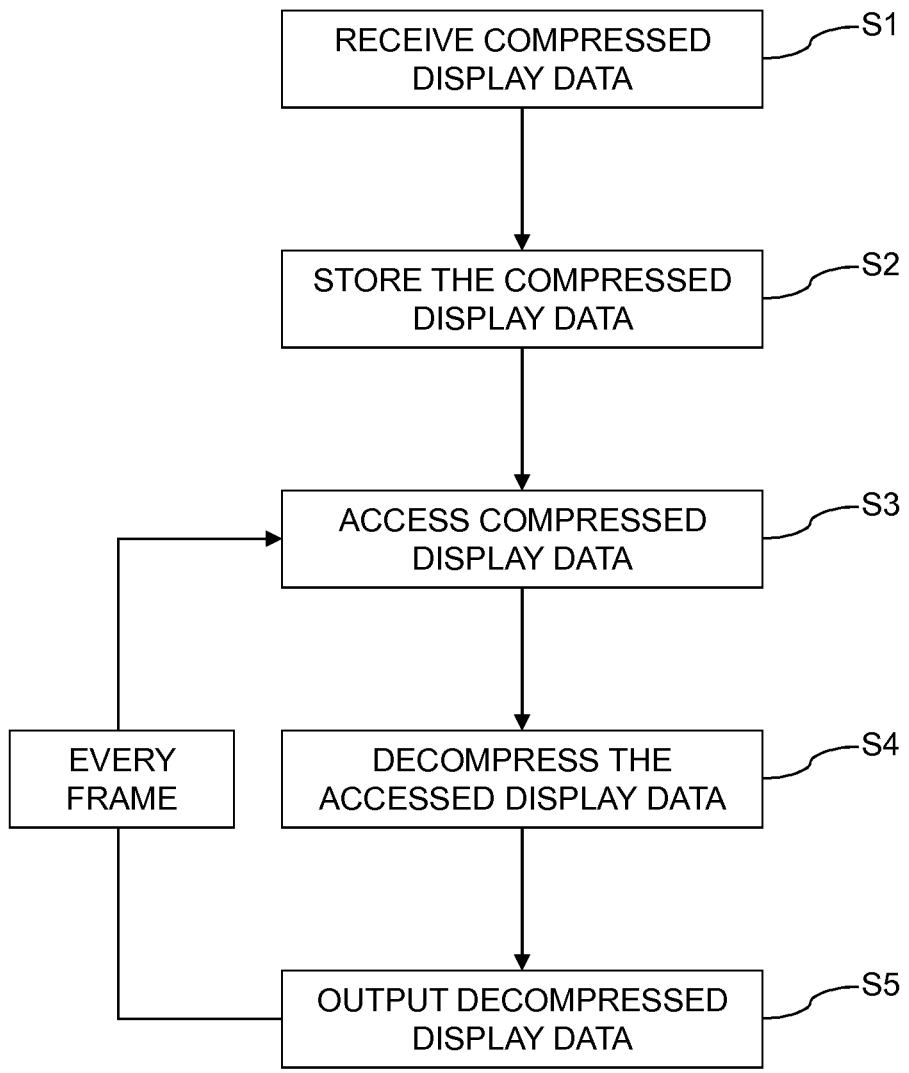
FIG. 6 is a flowchart of a method of operating the display control device.

FIG. 6 is a flowchart summarising the fundamental steps taken by the display control device 22 in delivering the display data for output. The method of operating the display control device 22 comprises, firstly step S1, which comprises receiving compressed display data, and secondly step S2, which comprises storing the received compressed display data. In the preferred embodiment, the received compressed display data comprises compressed frame data, each frame comprised of a plurality of rectangular tiles encoded with a wavelet transform. It is not material to the display control device 22 how the display data has been compressed, it could any known public scheme or via a proprietary compression algorithm.

The method continues with steps S3 to S5, for each frame refresh of the display device 12. These steps are, step S3 accessing stored compressed display data, step S4 decompressing the accessed display data, and step S5 outputting the decompressed display data. For each frame refresh, not all of the compressed display data need be accessed. If only a portion of the usable display area has been updated, then only the relevant tiles stored within the frame buffer store 28 will be accessed, decompressed and outputted for display on the display device 12. Every frame, so twenty-five times per second (or whatever frame rate is being used), the frame buffer store 28 is accessed for the required compressed display data.

The step S2 of storing the received compressed display data preferably comprises storing the compressed display data without first decompressing the display data. The display control device 22 simply operates by receiving the compressed display data and writing that display data, in its compressed form, directly into the frame buffer store 28. No intermediate processing steps are carried out on the compressed display data. This display data is now available for decompression and display, every frame refresh of the display device 12. Preferably, a single chip within the display control device 22 carries out all of the receipt, storage and decompression of the received compressed display data, using on-chip 8RAM for the storage of the compressed display data.

Although an embodiment has been described in detail above, it will be appreciated that various changes, modifications and improvements can be made by a person skilled in the art without departing from the scope of the present invention as defined in the claims.

The invention claimed is:

1. A method of operating a display control device having an input connected via a Universal Serial Bus (USB) connection to a source of compressed display data and an output connected via a display-specific connection to a display device, wherein the compressed display data is transported in a USB transport protocol over the USB connection and the output provides decompressed display data in a display-specific data standard over the display-specific connection to the display device, wherein the display control device is a separate device from the source and from the display device, the method comprising:
   receiving the compressed display data from the source of the compressed display data via the USB connection under control of a USB driver specifically for the display control device,
   unpackaging the received compressed display data from the USB transport protocol in which it is transported,
   storing the unpackaged received compressed display data in a frame buffer as it is received without first decompressing the received compressed display data, wherein the frame buffer is of a size whereby it can store the received compressed display data for a complete frame to be displayed on the display device, but is smaller than a size of the frame buffer that would be needed to store the display data for the complete frame if it was uncompressed, wherein the complete frame includes all the display data to be displayed on the display device independently and without reference to any other display data from other frames, and
   for each and every frame refresh of the display device, in a single frame refresh timescale:
      accessing the unpackaged compressed display data stored in the frame buffer,
      decompressing the accessed display data directly into the display-specific data standard without recourse to information regarding another frame, and
      outputting the decompressed display data to the display device in the display-specific data standard over the display-specific connection for display on the display device,
      wherein the compressed data is decompressed on-the-fly at each and every frame refresh of the display device for output to the display device in the display-specific standard without storing the decompressed display data after the decompressed display data is output to the display device in the display-specific data standard over the display-specific connection.

2. A method according to claim 1, wherein storing the received compressed display data comprises storing compressed display data for two consecutive frames.

3. A method according to claim 2, wherein the decompressed display data is delayed by a single frame compared to the received compressed display data.

4. A method according to claim 1, wherein the received compressed display data comprises compressed frame data, each frame comprised of a plurality of rectangular tiles encoded with a wavelet transform.

5. A method according to claim 1, wherein the received compressed display data comprises compressed frame data, each frame comprised of a plurality of rectangular tiles encoded with a discrete cosine transform.

6. A method according to claim 1, wherein the display-specific data standard is either VGA or DVI.

7. A display control device having an input configured to be connected via a Universal Serial Bus (USB) connection to a source of compressed display data and an output configured to be connected via a display-specific connection to a display device, wherein the compressed display data is transported in a USB transport protocol over the USB connection and the output provides decompressed display data in a display-specific data standard over the display-specific connection to the display device, wherein the display control device is a separate device from the source and from the display device, the display control device comprising:
   a receiver configured to receive the compressed display data from the source of the compressed display data via the USB connection under control of a USB driver specifically for the display control device,
   a data controller configured to unpackage the received compressed display data from the USB transport protocol in which it is transported,
   a frame buffer configured to store the unpackaged received compressed display data as it is received without first decompressing the received compressed display data, wherein the frame buffer is of a size whereby it can store the received compressed display data for a complete frame to be displayed on the display device, but is smaller than a size of the frame buffer that would be needed to store the display data for the complete frame if it was uncompressed, wherein the complete frame includes all the display data to be displayed on the display device independently and without reference to any other display data from other frames, and
   a video decoder configured to, for each and every frame refresh of the display device, in a single frame refresh timescale:
      access the unpackaged compressed display data stored in the frame buffer,
      decompress the accessed display data directly into the display-specific data standard without recourse to information regarding another frame, and
      output the decompressed display data to the display device in the display-specific data standard over the display-specific connection for display on the display device,
      wherein the compressed data is decompressed on-the-fly at each and every frame refresh of the display device for output to the display device in the display-specific standard without storing the decompressed display data after the decompressed display data is output to the display device in the display-specific data standard over the display-specific connection.

8. A display control device according to claim 7, wherein the data controller is configured to store unpackaged compressed display data for two consecutive frames.

9. A display control device according to claim 8, wherein the decompressed display data is delayed by a single frame compared to the received compressed display data.

10. A display control device according to claim 7, wherein the received compressed display data comprises compressed frame data, each frame comprised of a plurality of rectangular tiles encoded with a wavelet transform.

11. A display control device according to claim 7, wherein the received compressed display data comprises compressed frame data, each frame comprised of a plurality of rectangular tiles encoded with a discrete cosine transform.

12. A display control device according to claim 7, wherein the display-specific data standard is either VGA or DVI.

13. A display system comprising:
computer having an output configured to output compressed display data in a Universal Serial Bus (USB) transport protocol via a USB connection,
a display device having an input configured to receive decompressed display data in a display-specific data standard over a display-specific connection and to display the decompressed display data on a screen, and
a display control device having an input coupled to the output of the computer via the USB connection and an output coupled to the input of the display device via the display-specific connection, the display control device comprising:
a receiver configured to receive the compressed display data from the computer via the USB connection under control of a USB driver specifically for the display control device,
a data controller configured to unpackage the received compressed display data from the USB transport protocol in which it is transported,
a frame buffer configured to store the unpackaged received compressed display data as it is received without first decompressing the received compressed display data, wherein the frame buffer is of a size whereby it can store the received compressed display data for a complete frame to be displayed on the display device, but is smaller than a size of the frame buffer that would be needed to store the display data for the complete frame if it was uncompressed, wherein the complete frame includes all the display data to be displayed on the display device independently and without reference to any other display data from other frames, and
a video decoder configured to, for each and every frame refresh of the display device, in a single frame refresh timescale:
access the unpackaged compressed display data stored in the frame buffer,
decompress the accessed display data directly into the display-specific data standard without recourse to information regarding another frame, and
output the decompressed display data to the display device in the display-specific data standard for display on the display device,
wherein the compressed data is decompressed on-the-fly at each and every frame refresh of the display device for output to the display device in the display-specific standard without storing the decompressed display data after the decompressed display data is output to the display device in the display-specific data standard over the display-specific connection.

14. A display system according to claim 13, wherein the display-specific data standard comprises either VGA or DVI.

15. A display system according to claim 13, wherein the data controller is configured to store unpackaged compressed display data for two consecutive frames.

16. A display system according to claim 15, wherein the decompressed display data is delayed by a single frame compared to the received compressed display data.

17. A display system according to claim 13, wherein the received compressed display data comprises compressed frame data, each frame comprised of a plurality of rectangular tiles encoded with a wavelet transform.

18. A display system according to claim 13, wherein the received compressed display data comprises compressed frame data, each frame comprised of a plurality of rectangular tiles encoded with a discrete cosine transform.

19. A non-transitory tangible computer readable medium including executable instructions which, when executed in a processing system, cause the processing system to:
receive compressed display data transported in a Universal Serial Bus (USB) transport protocol via a USB connection from a source of the compressed display data,
unpackage the received compressed display data from the USB transport protocol in which it is transported,
store the unpackaged received compressed display data in a frame buffer as it is received without first decompressing the received compressed display data, wherein the frame buffer is of a size whereby it can store the received compressed display data for a complete frame to be displayed on a display device, but is smaller than a size of the frame buffer that would be needed to store the display data for the complete frame if it was uncompressed, wherein the complete frame includes all the display data to be displayed on the display device independently and without reference to any other display data from other frames, and
for each and every frame refresh of the display device, in a single frame refresh timescale:
access the unpackaged compressed display data stored in the frame buffer,
decompress the accessed display data directly into the display-specific data standard without recourse to information regarding another frame, and
output the decompressed display data to the display device in a display-specific data standard over a display-specific connection for display on the display device,
wherein the compressed data is decompressed on-the-fly at each and every frame refresh of the display device for output to the display device in the display-specific standard without storing the decompressed display data after the decompressed display data is output to the display device in the display-specific data standard over the display-specific connection.

20. A non-transitory tangible computer readable medium according to claim 19, wherein causing the processing system to store the received compressed display data comprises causing the processing system to store compressed display data for two consecutive frames.

21. A non-transitory tangible computer readable medium according to claim 20, wherein the decompressed display data is delayed by a single frame compared to the received compressed display data.

22. A non-transitory tangible computer readable medium according to claim 19, wherein the received compressed display data comprises compressed frame data, each frame comprised of a plurality of rectangular tiles encoded with a wavelet transform.

23. A non-transitory tangible computer readable medium according to claim 19, wherein the received compressed display data comprises compressed frame data, each frame comprised of a plurality of rectangular tiles encoded with a discrete cosine transform.

24. A non-transitory tangible computer readable medium according to claim 19, wherein the display-specific data standard is either VGA or DVI.

25. A method according to claim 24, wherein the tiles are encoded with a wavelet transform.

26. A method according to claim 24, wherein the tiles are encoded with a discrete cosine transform.

27. A method of operating a display control device having an input connected via a Universal Serial Bus (USB) connection to a source of compressed display data and an output connected via a display-specific connection to a display device, wherein the compressed display data is transported in a USB transport protocol via a USB connection and the output provides decompressed display data in a display-specific data standard over the display-specific connection to the display device, wherein the display control device is a separate device from the source and from the display device, the method comprising:
receiving the compressed display data from the source of the compressed display data via the USB connection under control of a USB driver specifically for the display control device,
unpackaging the received compressed display data from the USB transport protocol in which it is transported,
storing the unpackaged received compressed display data in a frame buffer as it is received without first decompressing the received compressed display data, wherein the frame buffer is of a size whereby it can store the received compressed display data for a complete frame to be displayed on the display device, but is smaller than a size of the frame buffer that would be needed to store the display data for the complete frame if it was uncompressed, wherein the complete frame includes all the display data to be displayed on the display device independently and without reference to any other display data from other frames, the complete frame comprising a plurality of tiles of display data, and
for each and every frame refresh of the display device, in a single frame refresh timescale:
accessing unpackaged received compressed display data stored in the frame buffer only for newly updated tiles,
decompressing the accessed display data directly into the display-specific data standard without recourse to information regarding another frame, and
outputting the decompressed display data to the display device for only the updated tiles in the display-specific data standard over the display-specific connection for display on the display device,
wherein the compressed data is decompressed on-the-fly at each and every frame refresh of the display device for output to the display device in the display-specific standard without storing the decompressed display data after the decompressed display data is output to the display device in the display-specific data standard over the display-specific connection.

28. A display control device having an input configured to be connected via a Universal Serial Bus (USB) connection to a source of compressed display data and an output configured to be connected via a display-specific connection to a display device, wherein the compressed display data is transported in a USB transport protocol over the USB connection and the output provides decompressed display data in a display-specific data standard over the display-specific connection to the display device, wherein the display control device is a separate device from the source and from the display device, the display control device comprising:
a receiver configured to receive the compressed display data from the source of the compressed display data via the USB connection under control of a USB driver specifically for the display control device,
a data controller configured to unpackage the received compressed display data from the USB transport protocol in which it is transported,
a frame buffer configured to store the unpackaged received compressed display data as it is received without first decompressing the received compressed display data, wherein the frame buffer is of a size whereby it can store the received compressed display data for a complete frame to be displayed on the display device, but is smaller than a size of the frame buffer that would be needed to store the display data for the complete frame if it was uncompressed, wherein the complete frame includes all the display data to be displayed on the display device independently and without reference to any other display data from other frames, the complete frame comprising a plurality of tiles of display data, and
a video decoder configured to, for each and every frame refresh of the display device, in a single frame refresh timescale:
access the unpackaged compressed display data stored in the frame buffer only for newly updated tiles,
decompress the accessed display data directly into the display-specific data standard without recourse to information regarding another frame, and
output the decompressed display data to the display device for only the updated tiles in the display-specific data standard over the display-specific connection for display on the display device,
wherein the compressed data is decompressed on-the-fly at each and every frame refresh of the display device for output to the display device in the display-specific standard without storing the decompressed display data after the decompressed display data is output to the display device in the display-specific data standard over the display-specific connection.

29. A display control device according to claim 28, wherein the tiles are encoded with a wavelet transform.

30. A display control device according to claim 28, wherein the tiles are encoded with a discrete cosine transform.

31. A display system comprising:
a computer having an output configured to output compressed display data in a Universal Serial Bus (USB) transport protocol via a USB connection,
a display device having an input configured to receive decompressed display data in a display-specific data standard over a display-specific connection and to display the decompressed display data on a screen, and
a display control device having an input coupled to the computer via the USB connection and an output coupled to the input of the display device via the display-specific connection, the display control device comprising:

a receiver configured to receive the compressed display data from the source of the compressed display data via the USB connection under control of a USB driver specifically for the display control device, a data controller configured to unpackage the received compressed display data from the USB transport protocol in which it is transported, a frame buffer configured to store the unpackaged received compressed display data as it is received without first decompressing the received compressed display data, wherein the frame buffer is of a size whereby it can store the received compressed display data for a complete frame to be displayed on the display device, but is smaller than a size of the frame buffer that would be needed to store the display data for the complete frame if it was uncompressed, wherein the complete frame includes all the display data to be displayed on the display device independently and without reference to any other display data from other frames, the complete frame comprising a plurality of tiles of display data, and a video decoder configured to, for each and every frame refresh of the display device, in a single frame refresh timescale:

access the unpackaged compressed display data stored in the frame buffer only for newly updated tiles, decompress the accessed display data directly into the display-specific data standard without recourse to information regarding another frame, and output the decompressed display data to the display device for only the updated tiles in the display-specific data standard over the display-specific connection for display on the display device, wherein the compressed data is decompressed on-the-fly at each and every frame refresh of the display device for output to the display device in the display-specific standard without storing the decompressed display data after the decompressed display data is output to the display device in the display-specific data standard over the display-specific connection.

32. A display system according to claim 31, wherein the display-specific data standard comprises either VGA or DVI.

33. A display system according to claim 31, wherein the data controller is configured to store unpackaged compressed display data for two consecutive frames.

34. A display system according to claim 33, wherein the decompressed display data is delayed by a single frame compared to the received compressed display data.

35. A display system according to claim 31, wherein the tiles are encoded with a wavelet transform.

36. A display system according to claim 31, wherein the tiles are encoded with a discrete cosine transform.

* * * * *